Feb. 24, 1948. H. K. LEE 2,436,652
METHOD FOR SPROUTING BEANS
Filed Feb. 2, 1945 3 Sheets-Sheet 1

Inventor
Hsiang Kai Lee
By
Munson Hare
Attorney

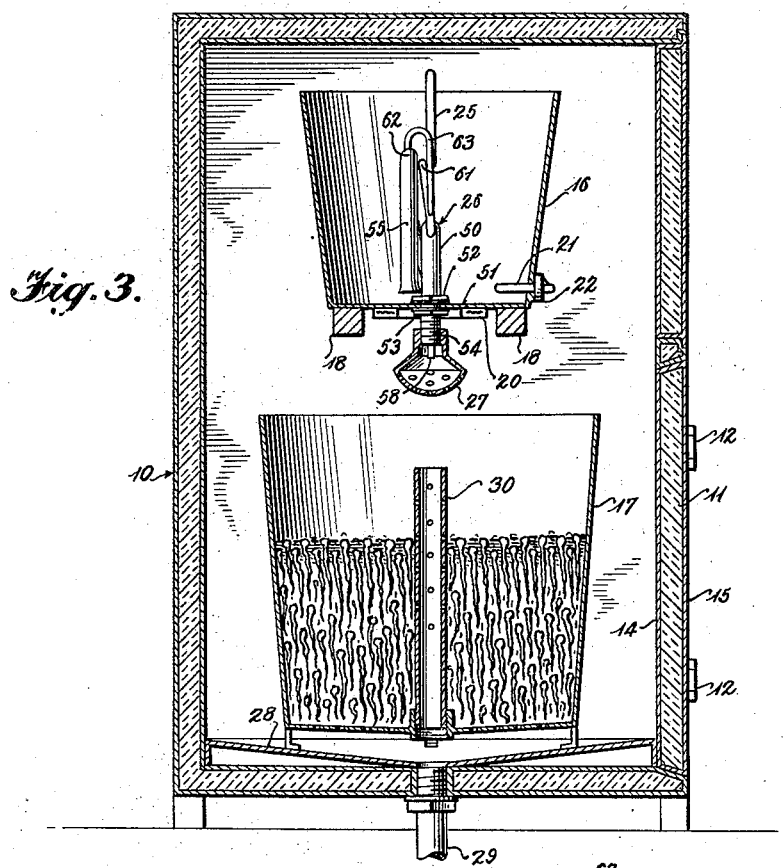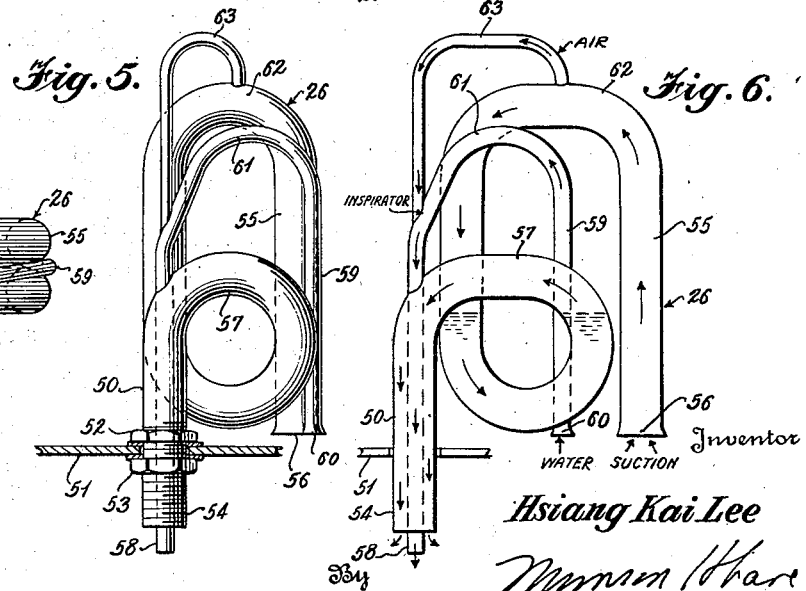

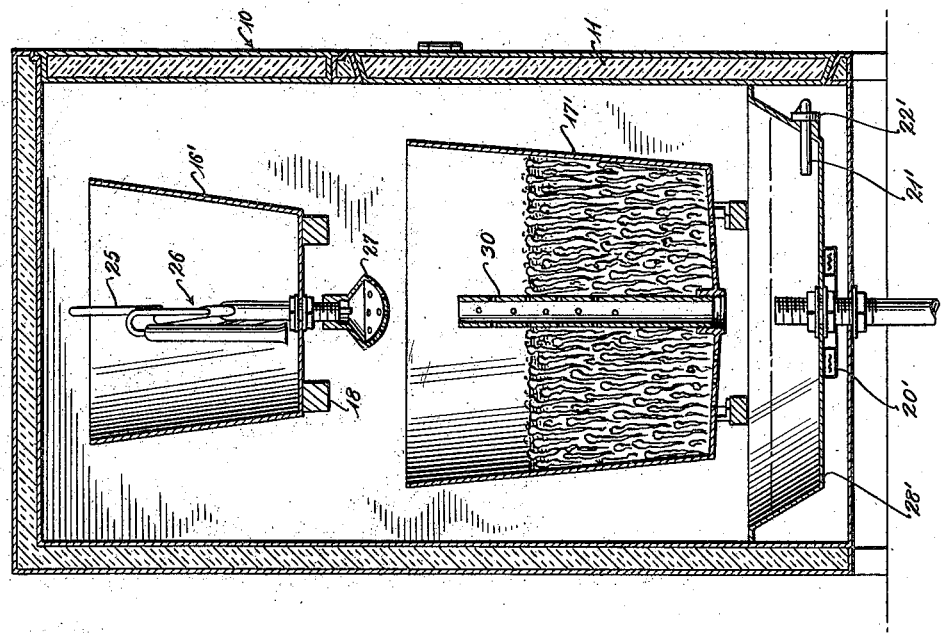
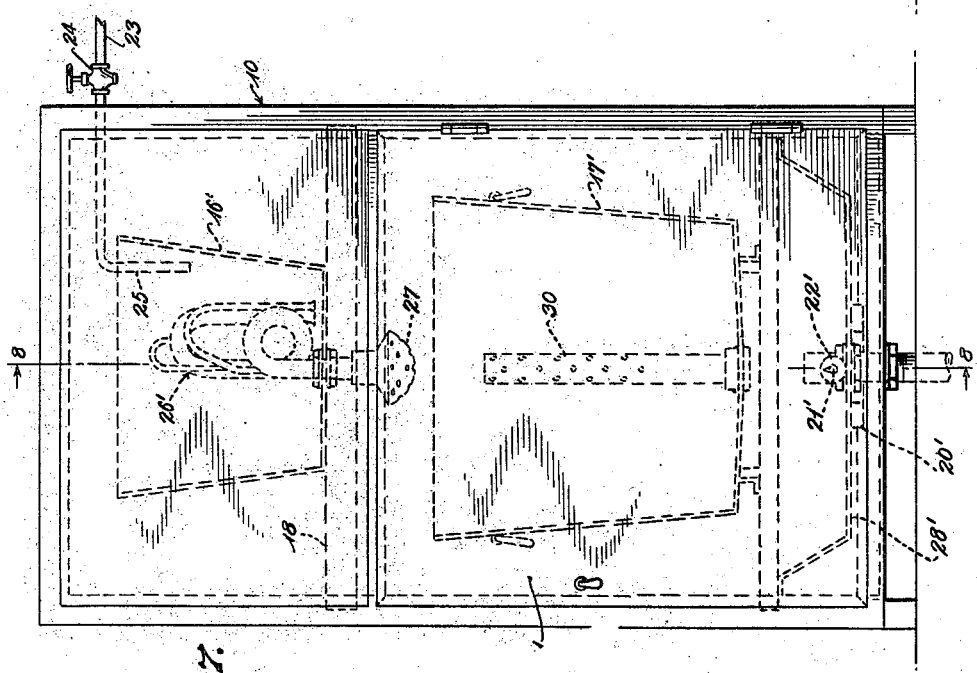

Patented Feb. 24, 1948

2,436,652

UNITED STATES PATENT OFFICE 2,436,652

METHOD FOR SPROUTING BEANS

Hsiang Kai Lee, Detroit, Mich.

Application February 2, 1945, Serial No. 575,903

2 Claims. (Cl. 47—1.2)

The invention relates to an improvement in method for sprouting mung beans, soya beans and other seeds.

During the present emergency, wherein nourishing foods are difficult to obtain, bean sprouts are vitally needed to supply vitamin C in order to obtain a balanced diet, particularly during winter months when fresh vegetables are very scarce. Such sprouts are needed to prevent scurvy and both mung beans and soya bean seeds are readily obtainable for this purpose. Although the sprouting of beans for food is an ancient practice a simple device for scientifically controlling operating conditions during sprouting is now needed. So far only research laboratories employing complicated methods and requiring large amounts of critical war material were considered feasible for scientifically controlling air conditions during sprouting, and accordingly the sprouting of soya beans has not become commercially practicable.

So far as I am aware my invention provides the first practical means for sprouting beans so that the hypocotyl of the sprout will have little root or leaf development and a very immature vascular development. This kind of sprout yields a maximum amount of vitamin C (ascorbic acid) and no starch in the cotyledons. The product is firm and crisp and maintains its form when cooked. The present technique is quite different from ordinary seed germination in that an etiolated seedling is the desired product. The present invention is designed to induce the slow growth of the seedlings so that the stored vitamins in the cotyledons are not respired but are slowly translocated to the elongated hypocotyls.

I am aware that others have designed various forms of apparatus intended for use in the sprouting of seeds, but these in most instances have involved the use of expensive equipment which is unobtainable under present war time conditions. The present invention is characterized by its simplicity and marked utility for the purpose for which it has been designed.

The underlying purpose of the invention is accordingly to produce vitamin C in the form of tender sprouts for use in place of fresh vegetables during the winter months when outdoor growth is impossible. My invention serves to promote the growth of seedlings in which the stored vitamin C in the cotyledon is not respired but is translocated to the elongated hypocotyls. An important object of the invention is to provide ideal growth conditions similar to nature's germination process by promoting the growing of sprouts, but without the use of soil or chemicals. In the present invention the process requires the use of clean water under automatic control, thus eliminating human labor. The invention can also be adapted for use as a germination tester and mycological spore growing device.

The present invention involves the use of a minimum amount of scarce materials, thus conforming to war time conditions. Its simplicity will be readily apparent in comparison with previously proposed bean sprouting devices which are so complicated as to be practically impossible to build under present conditions. Yet by actual demonstration my improved device can grow better and more uniform sprouts than is possible with prior art devices.

Another feature of the invention resides in the novel method of controlling humidity and temperature. My invention comprises an automatic water sprinkler system including pipes without moving parts, and its operation does not require either a time interval clock or solenoid valves, which are critical items. When the desired amount of water has accumulated it is automatically flushed without any external mechanical means to start it. The operation is definitely positive. My improved system requires only a water pail, a surface heater and a thermal switch in combination which opens and shuts the heater at predetermined temperatures. The seed and sprout container itself is designed to hold a large mass of material and is relatively inexpensive. The system does not require a series of complicated pressure tanks along with complicated controls, as in most prior art devices.

Another object of the invention is to provide a novel sprouting container which includes specially designed drainage devices combined with improved air circulation. The invention permits seeds or beans to be soaked in the same sprouting container. This is an important feature in that it serves to prevent the disturbing and bruising of soaked seeds by re-handling. After the beans are properly soaked drainage is obtained by merely unscrewing a ventilator which has been used during the sprouting process. The improved ventilator allows sprouts to grow in much larger mass, which may be as much as three feet deep. I have found it unnecessary to use trays which, in some instances, have proved commercially impractical.

Another feature of the invention resides in the fact that in accordance with my invention the water pail or tank is placed directly above the sprouting container, thus employing a gravity flow flushing system. The fresh water is supplied at regular intervals, thus eliminating stale water and the consequent growth of bacteria.

The invention will be more readily understood by reference to the accompanying drawings, in which are set forth illustrative embodiments of the inventive thought.

Fig. 3 is a vertical section on line 3—3 of Fig. 1;

Fig. 4 is a top plan view of an automatic flush siphon used for discharging the water at timed intervals from the upper water container to the lower sprouting container;

Fig. 5 is a side view of the same;

Fig. 6 is a diagrammatic view of the double siphon with the separation of parts exaggerated to better indicate the operation;

Fig. 7 is a view corresponding to Fig. 1 showing a modified form of the sprouting cabinet wherein the heater and thermal switch are located in the lower portion instead of the upper portion of the cabinet; and Fig. 8 is a vertical section corresponding to Fig. 3 showing the modification.

Figure 1:
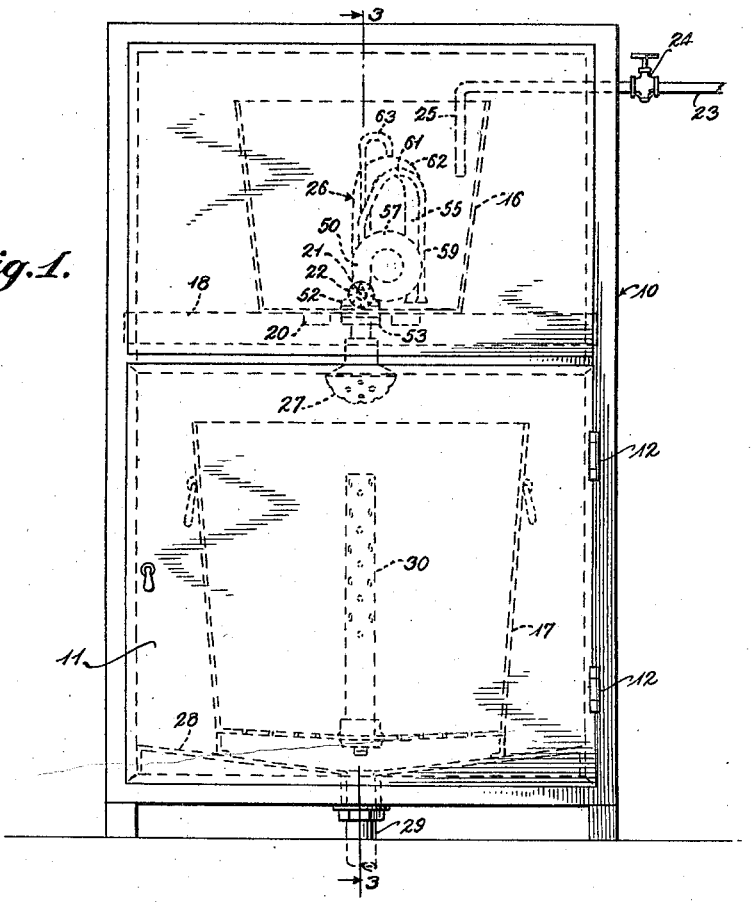
Fig. 1 is a front view of the cabinet embodying my invention with the internal mechanism indicated by dotted or dash lines.

The apparatus may be housed in a suitable cabinet 10 which may be built to resemble an ordinary refrigerator cabinet. As shown the cabinet includes a door 11 hinged at 12 through which access to the interior may be had for removing the sprouts and cleaning the container. The walls of the cabinet may be composed of masonite or other suitable material and may be covered inside and out with sheet metal, as indicated at 14 and 15.

The cabinet houses an open topped water tank or pail 16 in the upper portion thereof and a sprouting chamber 17 in the lower portion. The water pail 16 and sprouting chamber 17 are preferably made either of white porcelain, enamel or some non-corroding material for sanitary purposes. The water tank is supported in the upper portion of the tank by means of horizontal members 18, 18 extending transversely across the container. Both the water tank 16 and sprout container 17 are so mounted as to permit their ready removal from the cabinet through the door 11.

The necessary quantity of air is supplied to the sprouting chamber through the water which is admitted to the tank 16 and through small openings about the inlet and outlet pipe connections. It is found that sufficient oxygen is supplied through these sources. Light is excluded to avoid undesirable color in the growth of sprouts.

The water pail or tank 16 is provided with a suitable surface electric heater 20 which is controlled by thermal switch diagrammatically indicated at 21 and communicating with the bottom of the tank. By this means the water may be heated to the desired temperature approximately within the range of 80 to 100° F. The water pail being open insures proper circulation of humidified air to the sprouting chamber. The exact temperature may be regulated by means of a dial 22 associated with the thermal switch 21. When the temperature rises above a preset point the switch automatically shuts off the heater, and when it falls below such temperature the heater is automatically turned on. The switch maintains a very uniform temperature.

City water may be supplied to the tank through a drip pipe 23, which may be regulated by suitable valve 24 to fill the water tank or pail 16 to a desired level within a predetermined time. The pipe 23 is provided with a down turned portion 25 which enters the tank 16. The tank 16 is provided with an automatic flush unit 26 which serves to release the water from the pail at predetermined intervals and sprinkles the water through a spray head 27. The automatic flush device 26 is shown in detail in Figs. 4, 5 and 6, and will be more fully described hereinafter. By this mechanism the water is evenly distributed over the beans or seeds and no equalizing tank or mixer is required.

The sprouting container 17 is designed to grow sprouts in a large mass, thus making the invention commercially practicable. Suitable drainage is provided at the bottom through a drip pan 28 and drainage pipe 29, and a removable ventilator pipe 30 having openings therein extends upwardly through the mass of beans and sprouts and provides aeration within the sprouting mass so as to insure better and more uniform quality of the sprouts.

In the operation of the invention water from a public service supply enters through the pipe 23 and gradually fills up the pail 16 to the desired level. As the pail is being filled the heater 20 and the thermal switch 21 control the humidity and temperature within the sprouting chamber. The water is flushed by means of the automatic flushing device 26 and sprinkles through the spray head 27 evenly over the sprouting mass 31 in the sprouting container 17. The water seeps between the seeds or beans to the drip pan 28 and thence through the drain connection 29.

As more fully shown in Figs. 4, 5 and 6, the flushing device comprises a double siphon made up of a main pipe siphon and a secondary or small pipe siphon cooperating therewith and designed to initiate flow in the main siphon, and an inspirator connecting the pipe of the main siphon to the discharge pipe of the small pipe siphon.

The main siphon includes a discharge pipe 50 which is adapted to be clamped in the bottom 51 of the tank 16 by means of suitable clamping nuts 52 and 53. The pipe is provided with a threaded nipple 54 which screws into the discharge head of the sprinkler 27.

The main siphon also includes in addition to the discharge pipe 50 an inlet or suction pipe 55, the end of which extends nearly to the bottom of the tank 16. The main siphon also includes a coil 57 which serves as a water seal.

The smaller or secondary siphon includes a discharge pipe 58 extending axially through the leg 50 of the main siphon, and an inlet leg 59 having a suction inlet 60 at approximately the level of the inlet 56 of the main siphon. It will be noted that the upper portion of the bend 61 of the secondary siphon is not as high as the corresponding portion 62 of the main siphon, which portion 62 is connected through a small pipe or inspirator 63 with the discharge leg 58 of the secondary siphon.

The function of the double siphon is to serve as an automatic flushing valve without moving parts whereby water is discharged at regular intervals from the pail 16 through the spray nozzle 27 to the sprouting mass within the container 17. As previously set forth, water is admitted to the pail 16 through a pipe 23 which is connected to a needle valve. It is important to admit water very slowly; that is to say, in a slow drip so as to prolong the time interval from one to three hours. For such a slow drip it has been found that water will pass through the U-bends of ordinary siphons without creating the vacuum necessary to flush the water. This has been found in actual test and accordingly the present double siphon including the water seal or loop 57 in the main siphon has been designed to solve the problem. It has been found that the smaller pipe of the second siphon takes care of the slow drip of the water as desired.

When the water admitted through the inlet pipe 23 reaches a predetermined level the smaller siphon will commence operation first owing to the fact that its bend 61 is lower than the corresponding bend 62 of the main siphon. As water flows through the small siphon it serves to draw out the air from the main siphon through the action of the inspirator pipe 63 and thus the action in the main siphon is initiated.

While the improved siphon is particularly designed for use in the present system, wherein it functions much more efficiently than the ball type discharge valve, it may also be used in other connections and for other purposes. It is positive in its operation and no moving parts are involved which are likely to get out of order and interfere with the automatic operation of the system.

In the previously described embodiment of the invention the heater and control switch are located in the upper portion of the cabinet and are associated with the water supply tank or pail 16'. In the modification of the device as shown in Figs. 7 and 8 a heater 20' and control switch 21', with dial 22', are located in the lower part of the cabinet, the heater and control switch being within the drip pan 28' beneath the sprout container 17', which container may be supported upon transverse beams resting upon the drip pan.

By locating the heater and thermal switch at the bottom of the drip pan the air circulation is improved as the application of heat to the drip chamber causes the warm air to rise through the chamber. The warm moist air passes through the sprouting mass and is found to produce better and fatter sprouts.

As in the previously described embodiment of the invention, the heater raises the temperature of the water in the pan to the desired temperature of from 80 to 100° F. The pan being open the water, when heated, produces circulation of humidified air to the sprouting chamber. The temperature may be regulated on the dial 22' of the thermal switch 21'.

Figure 2:
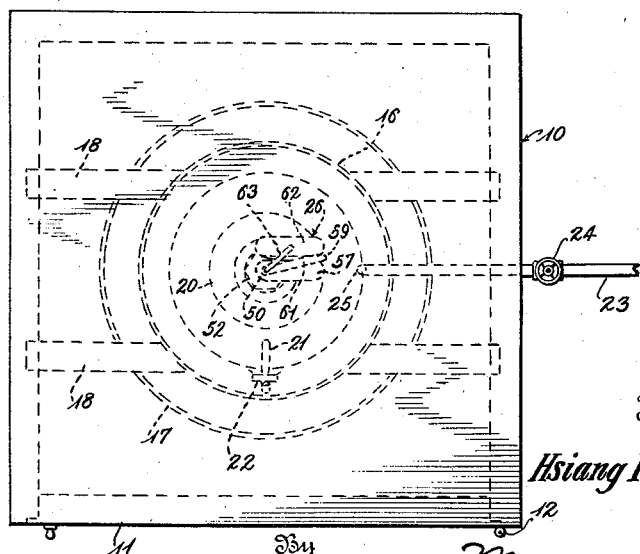
Fig. 2 is a top plan view of the same.

As the water container 16' is being filled the temperature of the water within the tank will be gradually warmed until it approaches the temperature within the sprout container 17'. The controlled heater within the drip pan insures proper humidity throughout the apparatus, the thermal switch serving to control the temperature. Water is supplied to the tank 16' and discharged therefrom in the manner previously described in connection with the embodiment set forth in Figs. 1 and 2.

The invention has been described in detail for the purpose of illustration, but it will be obvious that numerous modifications and variations may be resorted to without departing from the spirit of the invention.

I claim:

1. A method of promoting the growth of mung beans, soya beans and the like, which comprises supporting a large mass of sprouting beans in a closed chamber from which light is excluded, admitting limited quantities of air to the chamber, supplying water at regulated temperature to the sprouting mass at spaced intervals and in regulated amounts, circulating humidified air through the chamber, maintaining a temperature within the chamber of from 80 to 100° F., and passing humidified air upwardly and outwardly through the center of the mass of sprouting beans.

2. A method as set forth in claim 1 wherein water is automatically sprayed upon the sprouting beans from above at regulated intervals without the use of moving parts.

HSIANG KAI LEE.

REFERENCES CITED

The following references are of record in the file of this patent:

UNITED STATES PATENTS

| Number | Name | Date |
| --- | --- | --- |
| 1,274,578 | Nicholson | Aug. 6, 1918 |
| 1,413,484 | Moise | Apr. 18, 1922 |
| 1,755,218 | Jertberg | Apr. 22, 1930 |
| 1,951,463 | Wirz | Mar. 20, 1934 |
| 2,121,461 | Widmann | June 21, 1938 |
| 2,296,849 | Hammerstrom | Sept. 29, 1942 |